Nov. 16, 1926.
L. H. YOUNG
1,607,033
FEED GRINDER
Original Filed May 6, 1924   3 Sheets-Sheet 3
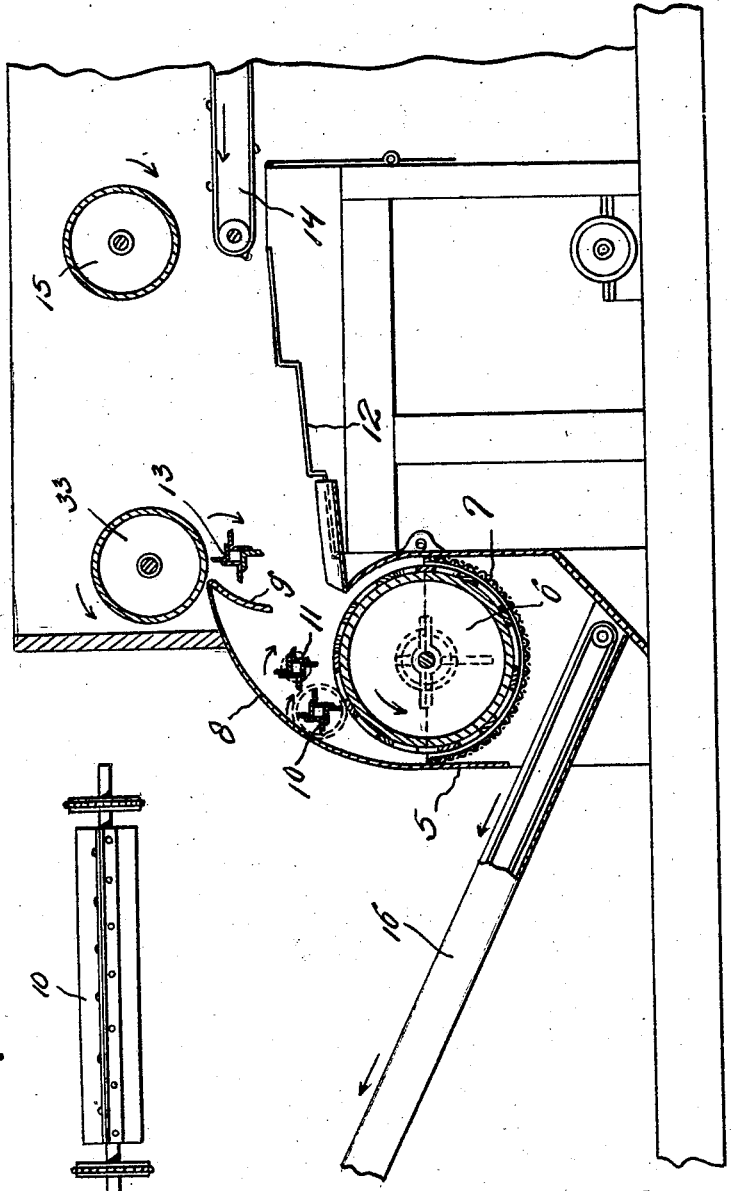
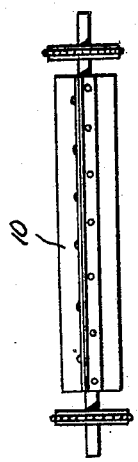
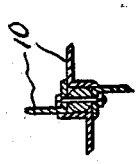

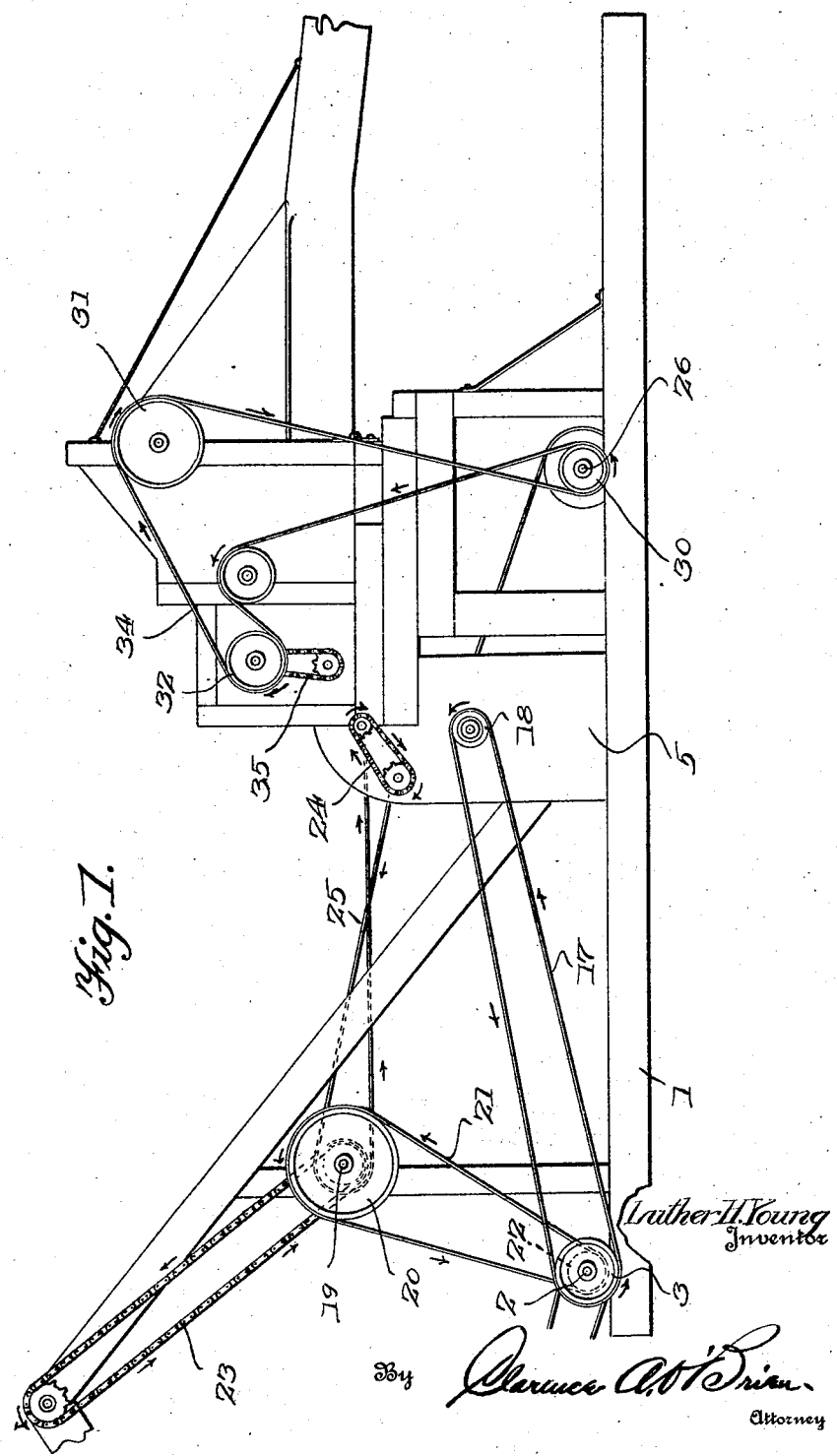

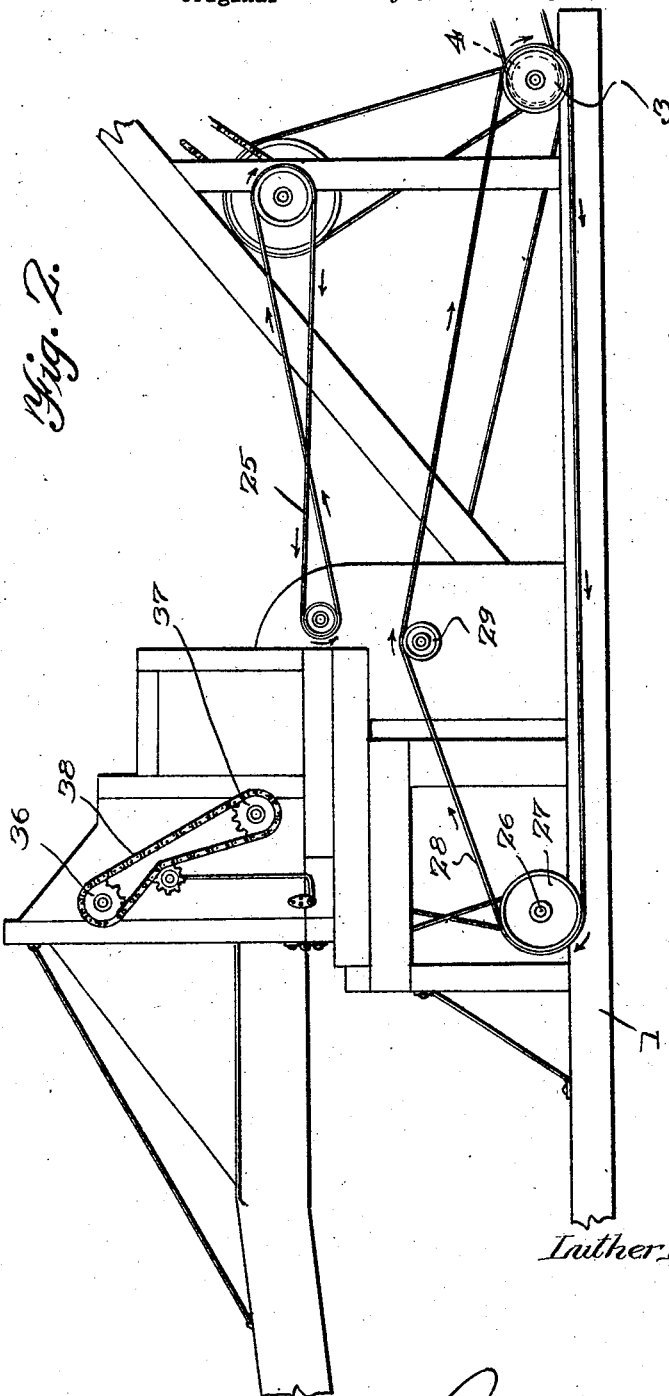

Patented Nov. 16, 1926.

1,607,033

UNITED STATES PATENT OFFICE.

LUTHER H. YOUNG, OF OAKLAND, NEBRASKA.

FEED GRINDER.

Application filed May 6, 1924, Serial No. 711,409. Renewed June 28, 1926.

This invention relates to feed grinders, and it consists in the novel features hereinafter described and claimed.

An object of the invention is to provide a feed grinder which may be readily connected with a feeder, and which may be used to advantage for grinding corn fodder, alfalfa hay, cane, millet, kafir corn, and similar feed.

A further object of the invention is to provide in a grinder of the character stated, means for preventing the coarse stems from interfering with the proper action of the grinding mill, so that the mill may quickly reduce the feed to ground condition.

With these objects in view, the grinder comprises a supporting frame upon which is mounted a casing. A shake-up pan is mounted in the casing and the conveyor is arranged to move over the said pan. Feeders are adapted to receive the material from the conveyor and move the material over the edge of the pan and present the same to feeders, some of which are housed under a hood, which is disposed above the mill. After being treated in the mill, the material passes through a screen and is conveyed away from the mill by an elevator, which is mounted upon the frame.

In the accompanying drawing:

Figure 1 is an elevation of the feed grinder looking at one side thereof.

Figure 2 is an elevation of the feed grinder looking at the opposite side thereof.

Figure 3 is a fragmentary diagrammatic view of the grinder.

Figure 4 is a side elevation of the beater used in the grinder.

Figure 5 is a transverse sectional view of the beater, shown in Figure 4.

As illustrated in the accompanying drawing, the feed grinder comprises a frame 1, upon which a master shaft 2, is journalled for rotation. Collars 3 are mounted upon the ends of the shaft 2, and a pulley 4 may be provided upon the intermediate portion of the said shaft, and around which a belt (not shown) may be trained, for the purpose of transmitting rotary movement to the said shaft 2.

A casing 5 is mounted upon the frame 1, and a cylinder 6 is journalled in the casing 5. A concaved screen 7 is located in the casing 5 below the cylinder 6. A hood 8 is disposed over the end of the casing 5 and is spaced above cylinder 6. The hood 8 is provided at its upper portion with a depending apron 9. Feeders 10 and 11 are journalled under the hood 8, and above the cylinder 6. A pan 12 is located below the lower edge of the apron 9, and a beater 13 is journalled above the pan 12. A conveyor 14 is located above the pan 12, and a feeder roll 15 is journalled about the delivery end of the conveyor 14. An elevator and conveyor 16 is mounted upon the frame 1, with its receiving end below the screen 7. A belt 17 is trained around one of the pulleys 3 and around a pulley 18 mounted upon a shaft of the cylinder 6. A shaft 19 is journalled upon the frame 1, and carries a pulley 20. A belt 21 is trained around the pulley 20 and a pulley 22 mounted upon the shaft 2. A sprocket chain 23 is operatively connected with the shaft 19, and with the active elements of the conveyor and elevator 16. The shafts of the feeders 10 and 11 are connected together at one side of the casing by a sprocket chain 24. A belt 25 operatively connects the shaft 19 with one of the beater shafts and serves as means for transmitting rotary movement from the shaft 19 to the beaters 10 and 11. A shaft 26 is journalled at the intermediate portion of the frame 1, and a pulley 27 is mounted thereon. A belt 28 is trained around the pulley 27 and one of the pulleys 3 carried by the shaft 2. An idler pulley 29 is journalled at the side of the casing of the apparatus and bears against the under surface of the upper run of the belt 28, as best shown in Figure 2 of the drawings. A pulley 30 is also mounted upon the shaft 26. A pulley 31 is mounted upon the feeder shaft. A pulley 32 is mounted upon the shaft of a feeder roll 33 which is mounted above the feeder 13 and a belt 34 is trained around the pulleys 30, 31 and 32, and is adapted to transmit rotary movement from the shaft 26 to the feeders. A sprocket chain 35 operatively connects the shaft of the feeder 33 with the shaft of the beater 13. A sprocket wheel 36 is mounted upon the shaft of the beater 15 and a sprocket wheel 37 is mounted upon the shaft of the conveyor 14. A sprocket chain 38 is trained around the sprocket wheels 36 and 37 and is adapted to transmit movement from the beater 15 to the conveyor 14.

The feed is carried by the conveyor under the feeder 15, which moves the same over the pan 12 and under the beater 33. The feeder forces the material under the feeder 13, and the material is subjected to the action of the said beater. From the said beater, the material is passed under the apron 9 of the hood 8, and under the beaters 11 and 10. The last mentioned beaters pass the feed down toward and upon the cylinder 6, where the material is ground and passed through the screen 7. From the screen 7, the material falls upon the elevator and conveyor 16 and is moved beyond the end of the frame 1.

The cylinder 6 is of usual form and such as is generally employed in an alfalfa mill for breaking the material into particles. As the material passes over the pan 12 and the top of the cylinder 6 it is compacted and partially broken by the beater 13 and the feeders 11 and 10. The material in this condition is carried by the cylinder 6 and is forced through the openings in the screen 7 and in so doing is reduced to particles or bits. The material thus reduced is removed from the machine by the conveyor 16 in a usual manner.

Having described the invention, what is claimed is:

A feed grinder comprising a concaved screen, a cylinder journaled for rotation above the screen, a hood disposed over the cylinder and screen and having a material receiving opening, said hood having at the upper side of said opening, an inwardly disposed concave apron, the lower edge of which is spaced above the cylinder, a beater located exteriorly of the hood and opposite the apron and above the lower edge thereof, a beater located under the hood and vertically above the center of the cylinder, and a third beater located under the hood and at the side of the second mentioned beater and above the side portion of the cylinder.

In testimony whereof I affix my signature.

LUTHER H. YOUNG.